(12) United States Patent
Cohn et al.

(10) Patent No.: US 9,087,168 B2
(45) Date of Patent: Jul. 21, 2015

(54) OPTIMIZING OPERATING RANGE OF AN ELECTRONIC CIRCUIT

(71) Applicant: International Business Machines Corporation, Armonk, NY (US)

(72) Inventors: John M. Cohn, Richmond, VT (US); David J. Hathaway, Underhill, VT (US); Sridhar H. Rangarajan, Bangalore (IN); Diyanesh Babu C. Vidyapoornachary, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 13/921,784

(22) Filed: Jun. 19, 2013

(65) Prior Publication Data
US 2014/0375380 A1 Dec. 25, 2014

(51) Int. Cl.
*G06F 17/50* (2006.01)

(52) U.S. Cl.
CPC ........ *G06F 17/5045* (2013.01); *G06F 17/5068* (2013.01); *G06F 17/5081* (2013.01)

(58) Field of Classification Search
CPC ............ G06F 17/5045; G06F 17/5068; G06F 17/5081
See application file for complete search history.

(56) References Cited

U.S. PATENT DOCUMENTS

| | | | |
|---|---|---|---|
| 6,301,515 B1 | 10/2001 | Wagner | |
| 6,425,110 B1 * | 7/2002 | Hathaway et al. | 716/108 |
| 6,535,735 B2 | 3/2003 | Underbrink et al. | |
| 6,543,032 B1 * | 4/2003 | Zolotykh et al. | 716/104 |
| 6,698,005 B2 * | 2/2004 | Lindkvist | 716/108 |
| 6,857,117 B2 * | 2/2005 | Teig et al. | 716/103 |
| 7,257,800 B1 | 8/2007 | Singh et al. | |
| 7,484,194 B2 * | 1/2009 | Gregory et al. | 716/113 |
| 7,500,207 B2 * | 3/2009 | Bhattacharya et al. | 716/100 |
| 7,624,364 B2 * | 11/2009 | Albrecht et al. | 716/113 |
| 7,657,855 B1 * | 2/2010 | Manaker et al. | 716/113 |
| 7,716,615 B2 * | 5/2010 | Goodnow et al. | 716/113 |
| 7,743,354 B2 * | 6/2010 | Albrecht et al. | 716/113 |
| 7,861,203 B2 * | 12/2010 | White et al. | 716/129 |
| 7,882,460 B2 * | 2/2011 | Drapa | 716/132 |
| 7,886,245 B2 * | 2/2011 | Hutzl et al. | 716/113 |
| 8,037,430 B2 * | 10/2011 | Papanikolaou et al. | 716/56 |
| 8,051,312 B2 | 11/2011 | Foley | |

(Continued)

OTHER PUBLICATIONS

Milos Stanisavljevic et al., "Selective Redundancy-Based Design Techniques for the Minimization of Local Delay Variations", 2010.

(Continued)

*Primary Examiner* — Naum B Levin
(74) *Attorney, Agent, or Firm* — Gibb & Riley, LLC; David A. Cain, Esq.

(57) ABSTRACT

According to a method herein, a portion of an electronic circuit is identified. The electronic circuit comprises logic circuitry. The portion of the electronic circuit is designed in at least two versions. Each of the at least two versions is evaluated using a plurality of operating conditions. The current operating conditions are determined. One version of the at least two versions is identified as a selected version based on the performance under the current operating conditions. The selected version has relatively optimal performance based on at least one of clock frequency, supply voltage, and power limit. The selected version is activated for use in the portion of the electronic circuit. The remaining versions of the at least two versions are deactivated.

20 Claims, 11 Drawing Sheets

(56) References Cited

U.S. PATENT DOCUMENTS

| | | | |
|---|---|---|---|
| 8,549,363 B2* | 10/2013 | Cher et al. | 714/47.3 |
| 8,653,338 B2* | 2/2014 | Kyle et al. | 800/312 |
| 8,760,217 B2* | 6/2014 | Chua-Eoan et al. | 327/530 |
| 8,819,608 B2* | 8/2014 | McElvain et al. | 716/119 |
| 2005/0097485 A1 | 5/2005 | Guenthner et al. | |
| 2005/0229017 A1 | 10/2005 | Webster et al. | |
| 2006/0186938 A1 | 8/2006 | Cao | |
| 2006/0218428 A1 | 9/2006 | Hurd | |
| 2007/0096775 A1 | 5/2007 | Elgebaly et al. | |
| 2008/0295042 A1 | 11/2008 | Dewan | |
| 2009/0058457 A1* | 3/2009 | Goodnow et al. | 326/10 |
| 2011/0173432 A1* | 7/2011 | Cher et al. | 713/100 |

OTHER PUBLICATIONS

Karl Schabas et al., "Using Logic Duplication to Improve Performance in FPGAs", 2003.

Hiroshi Yokoyama et al., Random Testing With Partial Circuit Duplication and Monitoring IDDQ, IEEE, 1997, pp. 7-11.

James Tschanz et al., "Resilient Circuits—Enabling Energy-Efficient Performance and Reliability", IEEE/ACM International Conference on Computer-Aided Design Digest of Technical Papers, pp. 71-73, Nov. 2009.

Kartik Mohanram, "Reliability and Test of High-Performance Integrated Circuits" Dissertation, Aug. 2003, pp. 1-94.

\* cited by examiner

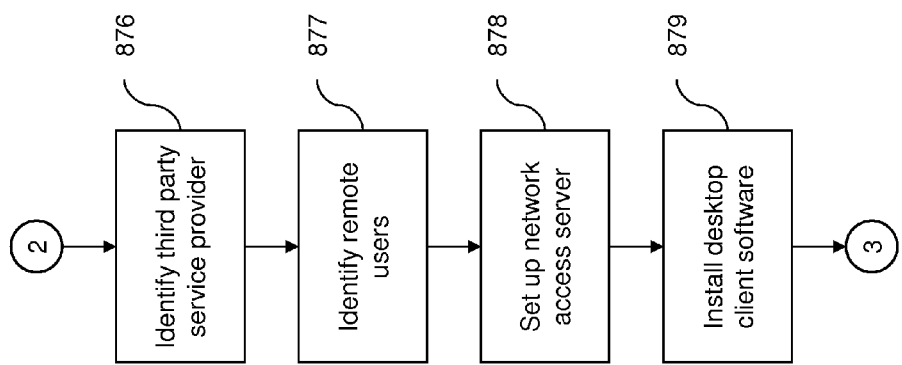

OPTIMIZING OPERATING RANGE OF AN ELECTRONIC CIRCUIT

BACKGROUND

The present disclosure relates to integrated electronic circuit design, and more specifically, to systems and methods to optimize the operating range of an electronic circuit.

Circuit paths with timing criticality, along with other factors such as additional timing margins (guard banding), power limit, circuit limited yield (CLY), and process conditions, decide the overall maximum frequency limit of operation. There are a variety of techniques to improve the maximum frequency of operation by optimizing these parameters; however, every technique has its penalty in terms of circuit overhead, power, chip real estate, and cost.

The power optimum implementation for a particular function may vary depending on the performance (clock frequency) requirement, supply voltage, and process point. This limits power savings if a single function implementation must be used across multiple conditions.

On the other side, with increasing technological advancements, chip yield has become very challenging. With very stringent process conditions and associated parameters, chip design now have to be flexible to account for broader process conditions to achieve desired maximum frequency of operation, especially on microprocessors.

Electronic circuits are designed to obtain higher performance without an increase in energy usage. In the context of processors, the performance is usually limited by the critical paths, which can make the maximum frequency of operation. Processor supports variety of features to optimize its energy usage. Dynamic voltage and frequency slewing (DVFS) is one widely adopted feature to optimize energy usage. Energy scale feature uses DVFS technique to adjust voltage and frequency in order to support nominal, slow, and fast modes of processor operation. In fast mode, the processor frequency is increased from its nominal frequency and voltage is accordingly increased to support higher frequency of operation. So this increased performance comes with a power penalty.

In many applications, power constraints may prevent all functions on an integrated circuit from being powered on at any given time. Different workloads may require different functional blocks of an integrated circuit to be active. This phenomenon of "dark silicon" (portions of an integrated circuit that are powered down and inactive) is becoming more common. Deciding which functions to place on an integrated circuit to make optimum use of the available circuit area is difficult, as is the closely related issue of determining which circuits should be active and which powered down during any particular workload.

Considering the above-mentioned drawbacks, therefore a method is needed to optimize the operating range of an electronic circuit and also to address yield challenges.

SUMMARY

Methods and systems herein relate to optimizing the operational range of an electronic circuit having different parts with different timing criticality in order to reduce power, increase frequency, or allow dynamic selection of a more optimal hardware implementation of one or more portions of a design depending on the current operational requirements (frequency requirement, power limit, chip process point, etc.).

Methods and systems herein create alternative implementations of a logical function that has timing criticality. A multiplexer unit chooses one of the implementations for operation and all deselected implementations are power gated. According to one non-limiting example, the criteria for selecting which implementation of a function to use may be based on a combination of one or more of the following: frequency requirements, power constraints, process variation (determined statically during manufacturing test or dynamically to account for aging, etc.). Different implementations of a critical portion of an electronic circuit may vary in multiple ways, such as devices with different threshold devices, wider/narrower wires, wider/narrower transistors, more compression level on paths, more or less use of complex (stacked) gates. Different implementations can also be designed to operate in different regions of a process space. For example, critical paths can be routed on different metal layers in different copies to mitigate metal variation, different spacing of buffers can be used depending on whether the process conditions for a particular chip are worse for gate or wire delay.

According to a method herein, a portion of an electronic circuit is identified. The electronic circuit comprises logic circuitry. The portion of the electronic circuit is designed in at least two versions. Each of the at least two versions is evaluated using a plurality of operating conditions. Current operating conditions are determined. One version of the at least two versions is identified as a selected version. The selected version has relatively optimal performance under the current operating conditions based on at least one of clock frequency, supply voltage, and power limit. The selected version is activated for use in the portion of the electronic circuit.

According to a method herein, at least one portion of an electronic circuit is identified. At least two versions of the at least one portion of the electronic circuit are created. Each of the at least two versions of the at least one portion of the electronic circuit is evaluated for performance under at least two operating conditions. Current operating conditions are determined. A relative best one version of the at least two versions of the at least one portion of the electronic circuit is determined, based on the performance under the current operating conditions. The relative best one version for the current operating conditions for the at least one portion of the electronic circuit is activated. Every other version of the at least two versions for each of the at least two operating conditions for the at least one portion of the electronic circuit is deactivated.

According to an integrated circuit structure herein, a first version of a portion of an electronic circuit is operatively connected to a first power supply. A second version of the portion of the electronic circuit is operatively connected to a second power supply. The integrated circuit structure includes a selector device having a plurality of inputs and a single output. The first version of the portion of the electronic circuit is operatively connected to the selector device, providing a first input. The second version of the portion of the electronic circuit is operatively connected to the selector device, providing a second input. A control circuit is operatively connected to the selector device. The control circuit determines current operating conditions. The control circuit identifies one of the first version of the portion of the electronic circuit and the second version of the portion of the electronic circuit as a selected version. The selected version has relatively optimal performance under the current operating conditions based on at least one of clock frequency, supply voltage, and power limit. The control circuit enables the selector device to pass the selected version as the single output from the selector device. The control circuit shuts off power to one of the first version of the portion of the electronic circuit and the second version of the portion of the electronic circuit not having been the selected version.

The methods and devices herein repeat the identifying, activating, and deactivating processes during usage of the electronic circuit to dynamically select different versions as the selected version of the portion of the electronic circuit as the current operating conditions change.

BRIEF DESCRIPTION OF THE DRAWINGS

The systems and methods herein will be better understood from the following detailed description with reference to the drawings, which are not necessarily drawn to scale and in which:

FIG. 11 is a schematic diagram of a virtual private network system according to systems and methods herein.

DETAILED DESCRIPTION

Figure 1:
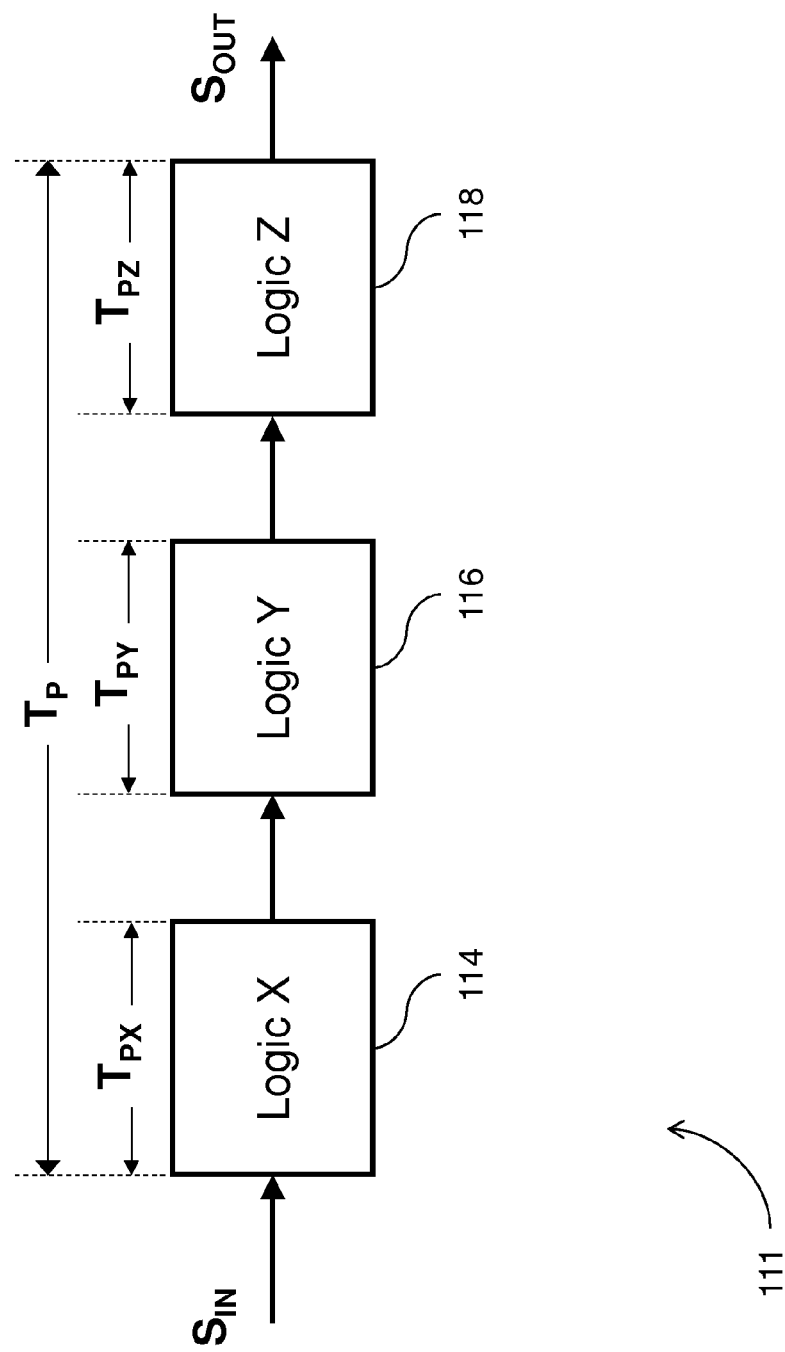
FIG. 1 is a block diagram illustrating various aspects of systems and methods herein.

It will be readily understood that the systems and methods of the present disclosure, as generally described and illustrated in the drawings herein, may be arranged and designed in a wide variety of different configurations in addition to the systems and methods described herein. Thus, the following detailed description of the systems and methods, as represented in the drawings, is not intended to limit the scope defined by the appended claims, but is merely representative of selected systems and methods. The following description is intended only by way of example, and simply illustrates certain concepts of the systems and methods, as disclosed and claimed herein.

FIG. 1 shows an electronic circuit, indicated generally as 111, having three logic elements, Logic X 114, Logic Y 116, and Logic Z 118. The signal path, $S_{IN} \rightarrow S_{OUT}$, determines the maximum frequency of operation. As shown in FIG. 1, Logic X 114 and Logic Z 118 comprise one or more circuit portions associated to logic macros. Alternatively, Logic X 114 and Logic Z 118 may complete the logic macros itself. The overall propagation delay through the electronic circuit 111 is indicated by $T_p$. As shown in FIG. 1, $T_{PX}$ is the propagation delay of Logic X 114, $T_{PY}$ is the propagation delay of Logic Y 116, and $T_{PZ}$ is the propagation delay of Logic Z 118. For purposes of discussion, assume Logic X 114 is a portion of the electronic circuit 111 having critical timing. Timing criticality may be identified in order to reduce power, increase frequency, or allow dynamic selection of a more optimal hardware implementation of the logic circuitry depending on operational requirements (frequency requirement, power limit, chip process point, etc.).

Figure 2:
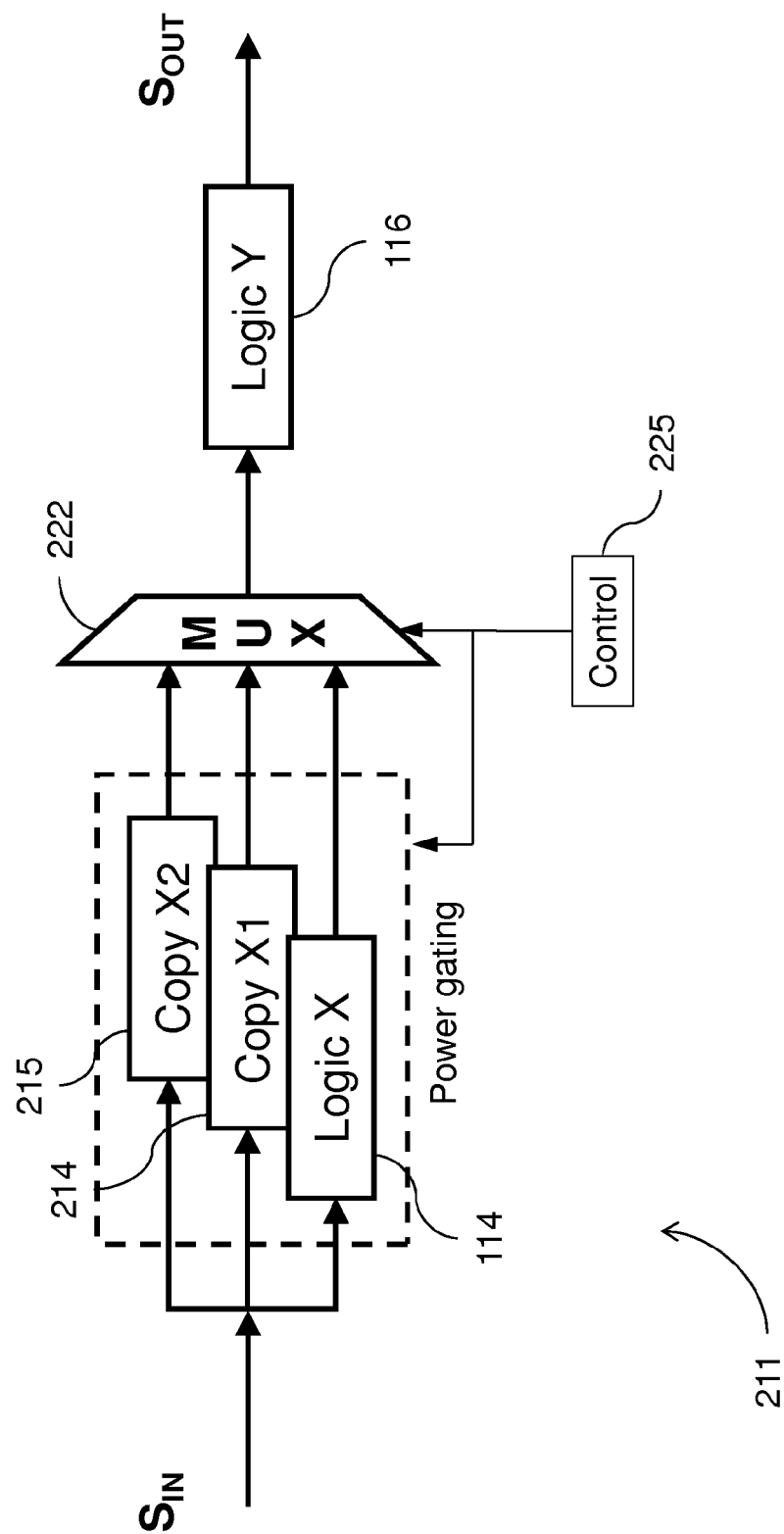
FIG. 2 is a block diagram illustrating various aspects of systems and methods herein.

Referring to FIG. 2, according to methods and systems herein, a new electronic circuit, indicated generally as 211, has been created. In the electronic circuit 211, the critical Logic X 114 has been duplicated as Copy X1 214 and Copy X2 215. Copy X1 214 and Copy X2 215 are alternative implementations of Logic X 114, which has the critical timing. Logic X 114 may be implemented in a variety of manners. For example, Logic X 114 may be designed using different sized transistors, different transistor thresholds, different threshold devices, different wiring levels, different wiring sizes, and different buffer spacing. These are just a few non-limiting examples. One of ordinary skill in the art would find many ways to create alternative implementations of Logic X 114.

In addition, different implementations for Copy X1 214 and Copy X2 215 can also be designed to operate in different regions of a process space. For example, critical paths could be routed on different metal layers of an integrated circuit chip in different copies in order to mitigate metal variation, different spacing of buffers could be used depending on whether the process conditions for a particular chip are worse for gate or wire delay.

Once the various implementations of the 'critical' portion of the electronic circuit 211 have been created, each version is evaluated for a variety of operating conditions. For example, the operating conditions may have different clock frequencies, different supply voltages, different power limits, and/or different process points. A relatively best one version of the various implementations is determined, based on each version's performance under each of the variety of operating conditions.

As shown in FIG. 2, the outputs from each of Logic X 114, Copy X1 214, and Copy X2 215 are provided to a multiplexer unit (MUX) 222 that passes one of the implementations for operation. A control circuit 225 is operatively attached to the multiplexer unit 222 and controls the output of the multiplexer unit 222 depending on the current operational requirements, such as frequency, power limit, etc. The criteria for selecting which implementation of Logic X 114, Copy X1 214, or Copy X2 215 to use can be based on a combination of one or more of frequency requirements, power constraints, process variation, etc. (Process variation can be determined statically during manufacturing test or dynamically during the life of the circuit in order to account for aging.)

After the relatively best version has been identified and selected by the control circuit 225, the selected version is activated and all deselected implementations are power gated. That is, power to all the deselected versions is turned off. According to devices and methods herein, and as described in more detail below, the deselected versions can be deactivated immediately or at a specified time after the relatively best version has been selected and activated.

FIG. 2 shows each of Logic X 114, Copy X1 214, and Copy X2 215 as distinct implementations; it is contemplated that, in some cases, one or more memory elements can be shared among the various implementations. Additionally, while activating the selected version, the control circuit 225 can copy a value in at least one memory element into the selected version from one of the deselected versions.

In summary, there may be some portion of the design which is difficult or expensive (in area, power, or design effort) to make operable across the desired range of operation (process variation, temperature, voltage, etc.), but for which it is possible to create alternative implementations, each of which is operable in a portion of the desired range of operation, such that the union of the operable ranges of operation of the alternative implementations covers the desired operating range. Alternatively, there may be some portion of the design for which a first implementation has high power consumption in a first portion of the desired range of operation, and for which a second implementation has a lower power consumption in the first portion of the desired range of operation, yet the second implementation is inoperable (or, less likely, has excessive power consumption) in some second portion of the desired range of operation in which the first implementation is operable and has acceptable power consumption. The common thread is that there are two (or more) alternative implementations of a portion of the design, and the design is configured to select between the alternative implementations based on current operating conditions, and all currently unused implementations are power gated off to reduce power consumption.

Figure 3:
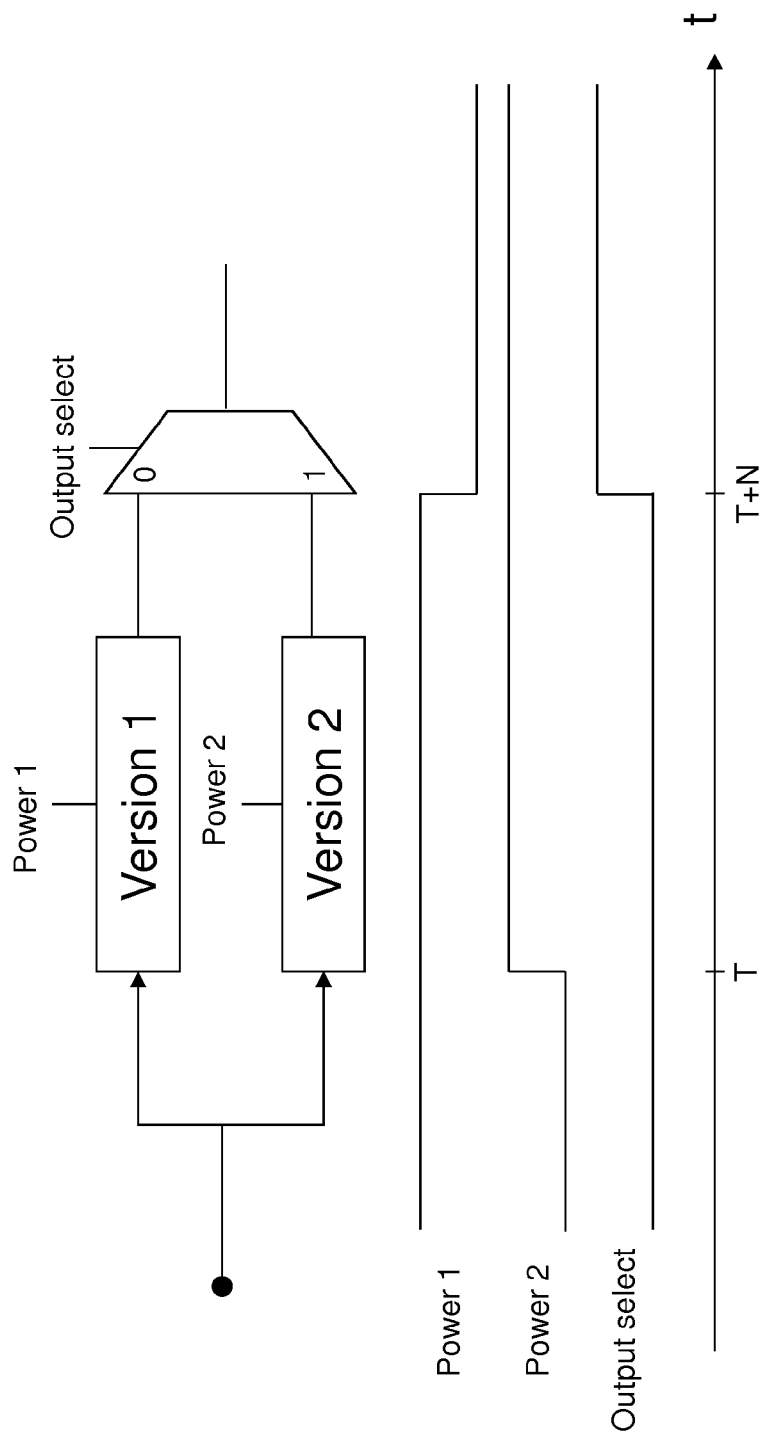
FIG. 3 is a block diagram illustrating various aspects of systems and methods herein.

For example, referring to FIG. 3, if a function for which multiple implementations are provided includes internal state, special considerations are needed because power gating of an implementation will cause the corruption or loss of any internal state data within that implementation. Several alternative approaches are possible. In a first exemplary approach, the internal state may be shared between the implementations (i.e., moved outside the function for which multiple implementations are provided). This may require an undesirable spatial separation between the combinational logic of the various implementations and the shared memory elements, introducing an undesirable delay. It may also require an undesirable number of multiplexing units and wiring resources to connect the combinational logic of the various implementations to the shared memory elements. In a second exemplary approach, the state may be copied from an implementation being deactivated into an implementation being activated when the change in active implementation occurs. This may introduce undesirable delays when changing the active implementation of a function to allow time for copying the state from memory elements in one implementation into another. It may also require an undesirable amount of outing resources and multiplexing units for communicating the state information to be copied between implementations. In a third exemplary approach, any change in selection of the active implementation may be restricted to times when it can be verified that the internal state may be discarded (e.g., at points where the internal state of interest would be reset to a state determined only by the inputs of the function). This method uses a lesser amount of extra resources for routing and multiplexing, but some functions may have no such times at which their internal state may be discarded, or such times may not coincide with times at which operating conditions change such that it is desirable to switch between alternative implementations of a function. In a fourth exemplary approach, in a pipelined function with a finite pipeline depth, or in any function in which it can be shown that the current internal state will have no direct or indirect effect on the future internal state after N cycles, the operation of an implementation being deactivated and an implementation being deactivated may overlap by N cycles, where the implementation being activated is turned on at time T so that it may begin to accumulate the correct internal state, but outputs from the implementation being deactivated continue to be used until time T+N, at which point, due to the aforementioned characteristics of the function, the internal state in the implementation being turned off and the implementation being turned on are identical. This fourth exemplary approach may reduce restrictions on the times at which a switch between alternative implementations may be performed. Like the third exemplary approach, it requires relatively less extra routing and multiplexing resources, but it will cause a temporary increase in power consumption while multiple implementations of the function are active.

The aforementioned approaches may be combined, such that a first one of these approaches is used for a first portion of the state of the function, a second approach is used for a second portion of its state, and so on. For example, of 100 bits of internal state, it may be determined that 75 bits may be safely discarded any time a switch in implementation is performed, and may be accommodated using an alternative approach. Another 20 bits are in a pipeline of two stages, such that they are dependent only on the function inputs during the past two cycles, and may be accommodated using another approach, with N equal to 2. The last 5 bits must be retained, and may be accommodated using the first approach. The various approaches described above are intended to be non-limiting examples of different implementations of the 'critical' portion for an electronic circuit.

Figure 4:
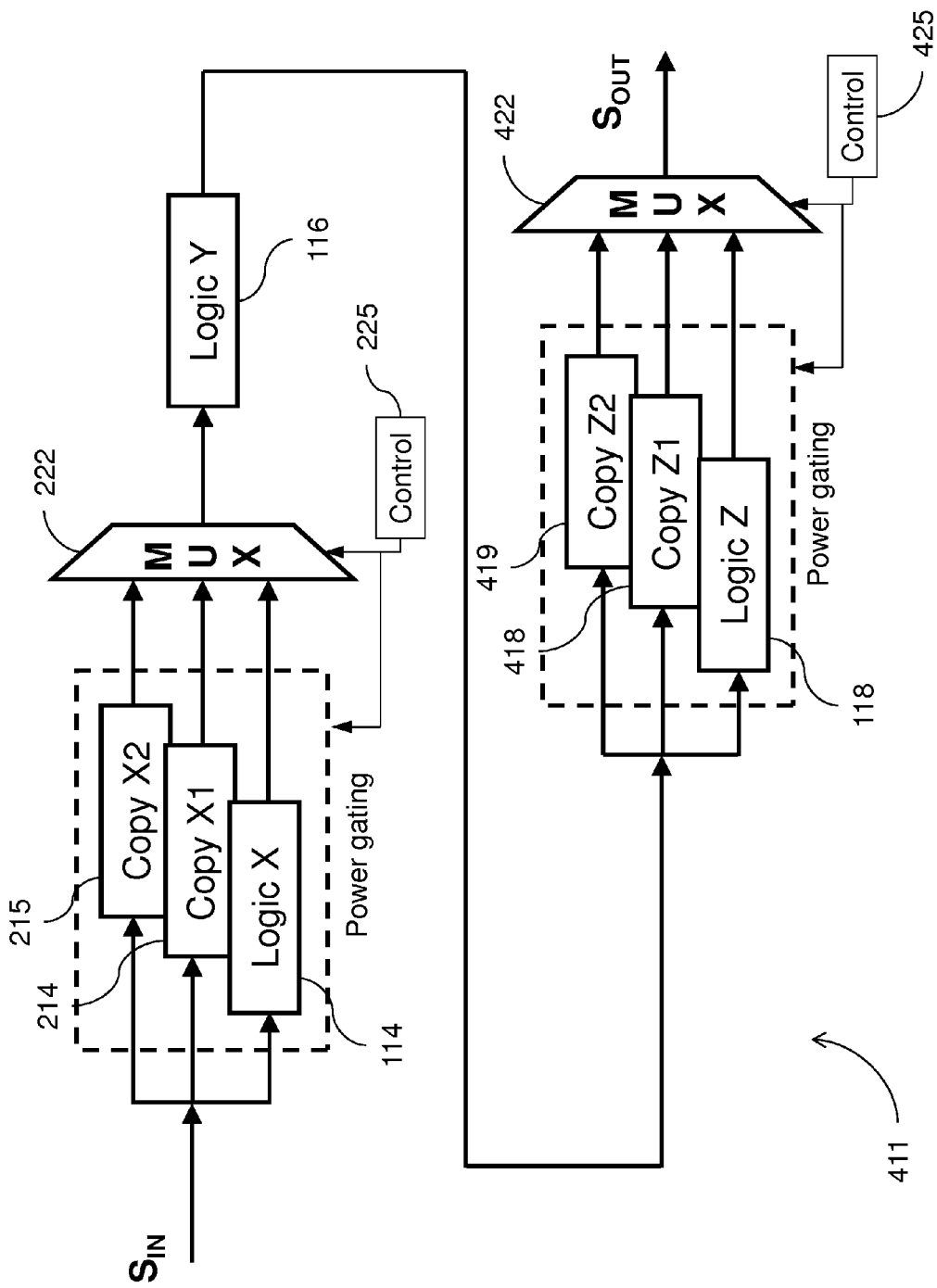
FIG. 4 is a block diagram illustrating various aspects of systems and methods herein.

FIG. 4 shows an example of multiple implementations of critical logic pieces in series. As described with reference to FIG. 1, Logic X 114 and Logic Z 118 may comprise one or more circuit portions associated to logic macros, or Logic X 114 and Logic Z 118 may complete the logic macro itself. In FIG. 4, Logic X 114 and Logic Z 118 each implement a portion of the 'critical' timing path. In the electronic circuit 411, Logic X 114 has been duplicated as Copy X1 214 and Copy X2 215. Additionally, in the electronic circuit 411, Logic Z 118 has been duplicated as Copy Z1 418 and Copy Z2 419. That is, Copy X1 214 and Copy X2 215 are alternative implementations of Logic X 114, and Copy Z1 418 and Copy Z2 419 are alternative implementations of Logic Z 118, each of which has a portion of the critical timing. As described above, Logic X 114 and Logic Z 118 may be modeled in a variety of manners.

The outputs from each of Logic X 114, Copy X1 214, and Copy X2 215 are provided to a first multiplexer unit 222 that passes one of the implementations to Logic Y 116. The first control circuit 225 is operatively attached to the first multiplexer unit 222 and controls the output of the first multiplexer unit 222 depending on the current operational requirements. The output of Logic Y 116 is provided to each of Logic Z 118, Copy Z1 418, and Copy Z2 419. The outputs from each of Logic Z 118, Copy Z1 418, and Copy Z2 419 are provided to a second multiplexer unit 422 that passes one of the implementations for operation. A second control circuit 425 is operatively attached to the second multiplexer unit 422 and controls the output of the second multiplexer unit 422 depending on the current operational requirements As described above, the criteria for selecting which implementation of Logic X 114, Copy X1 214, or Copy X2 215 to use and the criteria for selecting which implementation of Logic Z 118, Copy Z1 418, and Copy Z2 419 to use can be based on a variety of operating conditions.

Once the relatively best version of Logic X 114, Copy X1 214, or Copy X2 215 has been identified and selected by the first control circuit 225, the selected version is activated and all deselected implementations of that logic implementation are power gated off. Similarly, once the relatively best version of Logic Z 118, Copy Z1 418, and Copy Z2 419 has been identified and selected by the second control circuit 425, the selected version is activated and all deselected implementations of that logic implementation are power gated off.

It is contemplated that methods and systems described herein could be applied in three-dimensional chip stacking. For example, if there is some small portion of a design for which it is difficult to meet functional requirements due to process limitations, and the design is being implemented as a three-dimensional chip stack with chips of the same process on multiple layers, or of processes capable of implementing the difficult portion of the design, one could choose to place alternative implementations of the design portion on different chips of the three-dimensional stack. Because there may be process variation from chip to chip, the likelihood that all implementations on all layers will be outside the operating range will be much lower than the probability for a single copy on a single layer. The chips chosen for stacking could also be selected such that the critical portion is determined to work on at least one of the chips being stacked.

Alternatively, the methods and systems described herein could be applied by identifying multiple design portions that may have failures or may be difficult to make operable across the process range. If the process operable ranges for different design portions are different, one could choose a set of chips to stack through a covering process, ensuring that for each of design portions P1, ... PN, an implementation Pij of portion i on some chip j (j in 1 ... M) for M chip layers) is operable.

Figure 5:
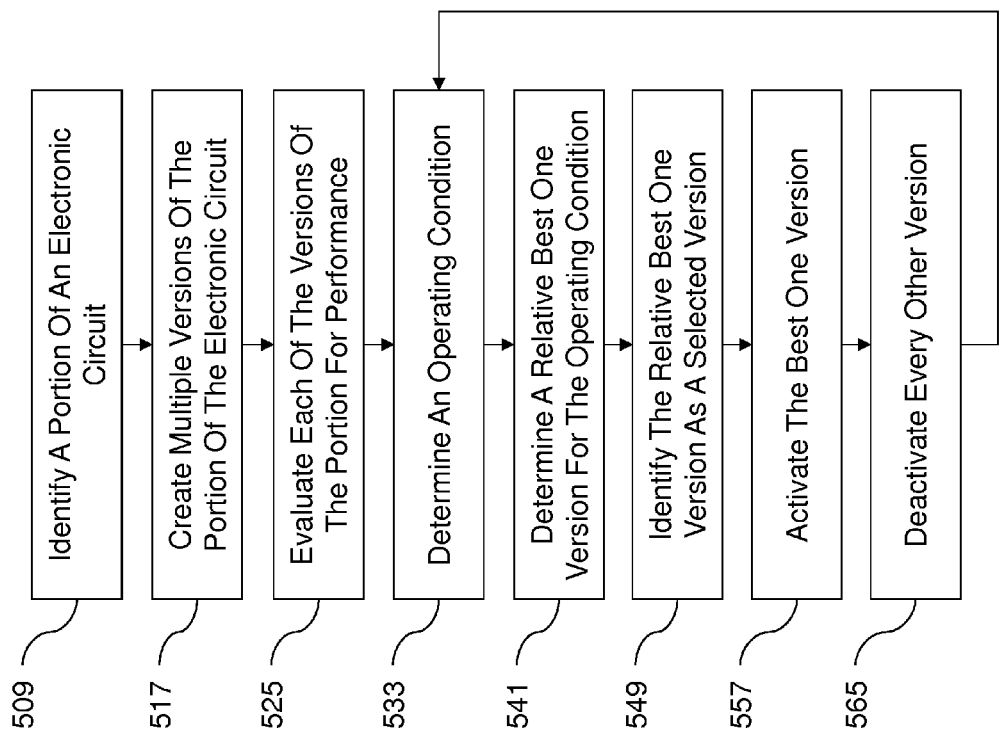
FIG. 5 is a flow diagram illustrating systems and methods herein.

FIG. 5 is a flow diagram illustrating the processing flow of an exemplary method according to systems and methods herein. At 509, at least one portion of an electronic circuit is identified. At 517, at least two versions of the at least one portion of the electronic circuit are created. Each of the versions of the at least one portion is evaluated for performance using a plurality of operating conditions, at 525. At 533 a current operating condition is determined. At 541, a relative best one version is determined, based on the current operating condition and the evaluated performance under the plurality of operating conditions. The relative best one version is identified as a selected version, at 549. The selected version has relatively optimal performance based on at least one of clock frequency, supply voltage, and power limit. At 557, the best one version is activated for use in the portion of the electronic circuit. At 565, every other version of the at least two versions for each of the plurality of operating conditions for the at least one portion of the electronic circuit is deactivated. The methods and devices herein repeat the identifying 549, activating 557, and deactivating 565 processes during usage of the electronic circuit to dynamically select different versions as the selected version of the portion of the electronic circuit as the current operating conditions change.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

For electronic applications, semiconducting substrates, such as silicon wafers, can be used. The substrate enables easy handling of the micro device through the many fabrication steps. Often, many individual devices are made together on one substrate and then singulated into separated devices toward the end of fabrication. In order to fabricate a microdevice, many processes are performed, one after the other, many times repeatedly. These processes typically include depositing a film, patterning the film with the desired micro features, and removing (or etching) portions of the film. For example, in memory chip fabrication, there may be several lithography steps, oxidation steps, etching steps, doping steps, and many others are performed. The complexity of microfabrication processes can be described by their mask count.

An integrated circuit structure according to systems and methods herein may include a first version of a portion of an electronic circuit and a second version of the portion of the electronic circuit. The first version of the portion of the electronic circuit is operatively connected to a first power supply and the second version of the portion of the electronic circuit is operatively connected to a second power supply. The integrated circuit structure includes a selector device, such as a multiplexer, having a plurality of inputs and a single output. The first version of the portion of the electronic circuit is operatively connected to the selector device, providing a first input, and the second version of the portion of the electronic circuit is operatively connected to the selector device, providing a second input. A control circuit that is operatively connected to the selector device identifies one of the first version and the second version as a selected version having relatively optimal performance based on the operating conditions. The control circuit enables the selector device to pass the selected version as the single output. The control circuit uses power gating to activate the selected version and shut off power to the one of the first version and the second version not having been the selected version.

Aspects of the present disclosure are described herein with reference to flowchart illustrations and/or block diagrams of methods, apparatus (systems), and computer program products according to various systems and methods. It will be understood that each block of the flowchart illustrations and/or two-dimensional block diagrams, and combinations of blocks in the flowchart illustrations and/or block diagrams, can be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

According to a further system and method herein, an article of manufacture is provided that includes a tangible computer readable medium having computer readable instructions embodied therein for performing the steps of the computer implemented methods, including, but not limited to, the method illustrated in FIG. 5. Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. Any of these devices may have computer readable instructions for carrying out the steps of the methods described above with reference to FIG. 5.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Furthermore, the computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In case of implementing the systems and methods herein by software and/or firmware, a program constituting the software may be installed into a computer with dedicated hardware, from a storage medium or a network, and the computer is capable of performing various functions if with various programs installed therein.

Figure 6:
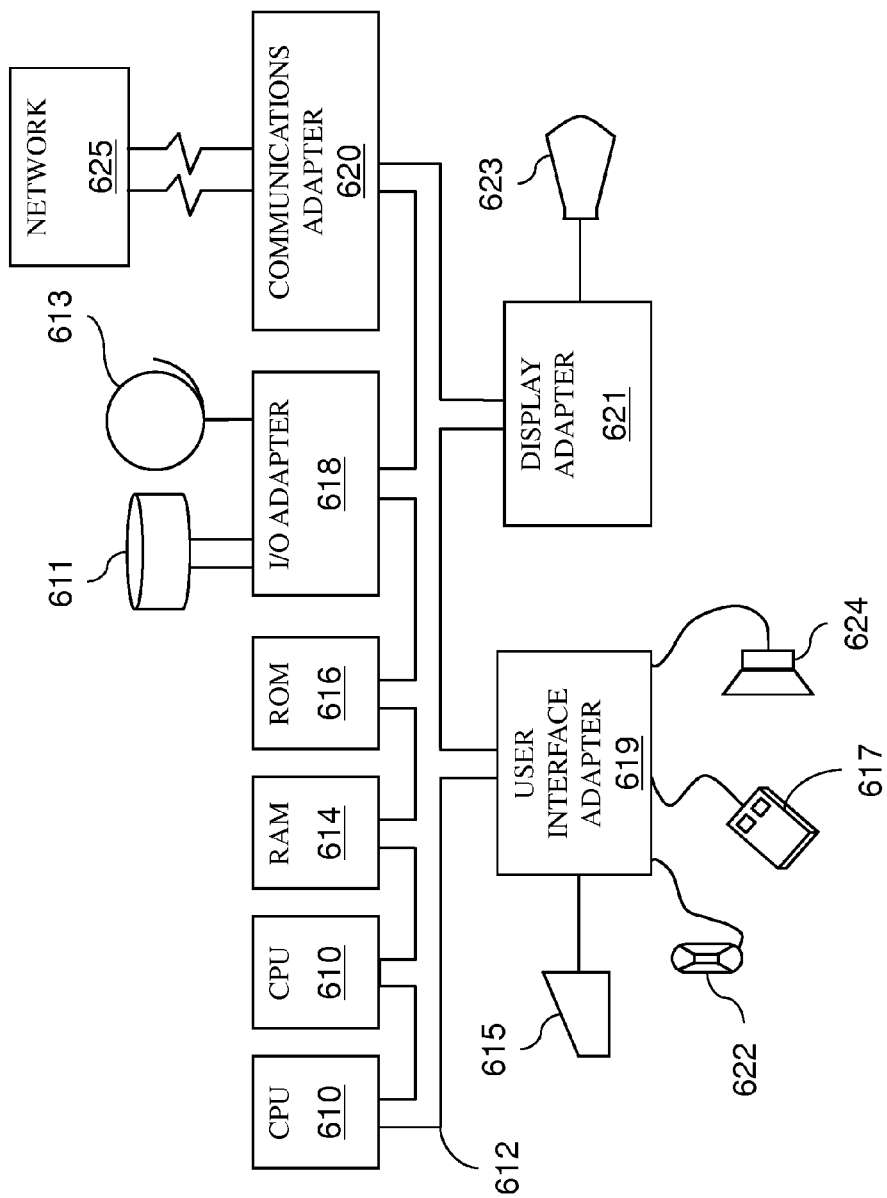
FIG. 6 is a schematic diagram of a hardware system according to systems and methods herein.

A representative hardware environment for practicing the systems and methods herein is depicted in FIG. 6. This schematic drawing illustrates a hardware configuration of an information handling/computer system in accordance with the systems and methods herein. The system comprises at least one processor or central processing unit (CPU) 610. The CPUs 610 are interconnected via system bus 612 to various devices such as a Random Access Memory (RAM) 614, Read-Only Memory (ROM) 616, and an Input/Output (I/O) adapter 618. The I/O adapter 618 can connect to peripheral devices, such as disk units 611 and tape drives 613, or other program storage devices that are readable by the system. The system can read the inventive instructions on the program storage devices and follow these instructions to execute the methodology of the systems and methods herein.

In FIG. 6, CPUs 610 perform various processing based on a program stored in a Read Only Memory (ROM) 616 or a program loaded from a peripheral device, such as disk units 611 and tape drives 613 to a Random Access Memory (RAM) 614. In the RAM 614, required data when the CPUs 610 perform the various processing or the like is also stored, as necessary. The CPUs 610, the ROM 616, and the RAM 614 are connected to one another via a bus 612. An I/O adapter 618 is also connected to the bus 612 to provide an input/output interface, as necessary. A removable medium, such as a magnetic disk, an optical disk, a magneto-optical disk, a semiconductor memory, or the like, is installed on the peripheral device, as necessary, so that a computer program read therefrom may be installed into the RAM 614, as necessary.

The system further includes a user interface adapter 619 that connects a keyboard 615, mouse 617, speaker 624, microphone 622, and/or other user interface devices such as a touch screen device (not shown) to the bus 612 to gather user input. Additionally, a communication adapter 620 including a network interface card such as a LAN card, a modem, or the like connects the bus 612 to a data processing network 625. The communication adapter 620 performs communication processing via a network such as the Internet. A display adapter 621 connects the bus 612 to a display device 623, which may be embodied as an output device such as a monitor (such as a Cathode Ray Tube (CRT), a Liquid Crystal Display (LCD), or the like), printer, or transmitter, for example.

In the case where the above-described series of processing is implemented with software, the program that constitutes the software may be installed from a network such as the Internet or a storage medium such as the removable medium.

Those skilled in the art would appreciate that the storage medium is not limited to the peripheral device having the program stored therein as illustrated in FIG. 6, which is distributed separately from the device for providing the program to the user. Examples of a removable medium include a magnetic disk (including a floppy disk), an optical disk (including a Compact Disk-Read Only Memory (CD-ROM) and a Digital Versatile Disk (DVD)), a magneto-optical disk (including a Mini-Disk (MD) (registered trademark)), and a semiconductor memory. Alternatively, the storage medium may be the ROM 616, a hard disk contained in the storage section of the disk units 611, or the like, which has the program stored therein and is distributed to the user together with the device that contains them.

As will be appreciated by one skilled in the art, aspects of the systems and methods herein may be embodied as a system, method, or computer program product. Accordingly, aspects of the present disclosure may take the form of an entirely hardware system, an entirely software system (including firmware, resident software, micro-code, etc.) or an system combining software and hardware aspects that may all generally be referred to herein as a "circuit," "module", or "system." Furthermore, aspects of the present disclosure may take the form of a computer program product embodied in one or more computer readable medium(s) having computer readable program code embodied thereon.

Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a Read-Only Memory (ROM), an Erasable Programmable Read-Only Memory (EPROM or Flash memory), an optical fiber, a magnetic storage device, a portable compact disc Read-Only Memory (CD-ROM), an optical storage device, a "plug-and-play" memory device, like a USB flash drive, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the Figures illustrate the architecture, functionality, and operation of possible implementations of systems, methods, and computer program products according to various systems and methods herein. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Deployment types include loading directly in the client, server, and proxy computers via loading a storage medium such as a CD, DVD, etc. The process software may also be automatically or semi-automatically deployed into a computer system by sending the process software to a central server or a group of central servers. The process software is then downloaded into the client computers that will execute the process software. The process software is sent directly to the client system via e-mail. The process software is then either detached to a directory or loaded into a directory by a button on the e-mail that executes a program that detaches the process software into a directory. Alternatively, the process software is sent directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then stored on the proxy server.

While it is understood that the process software may be deployed by manually loading directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then stored on the proxy server.

Figure 7:
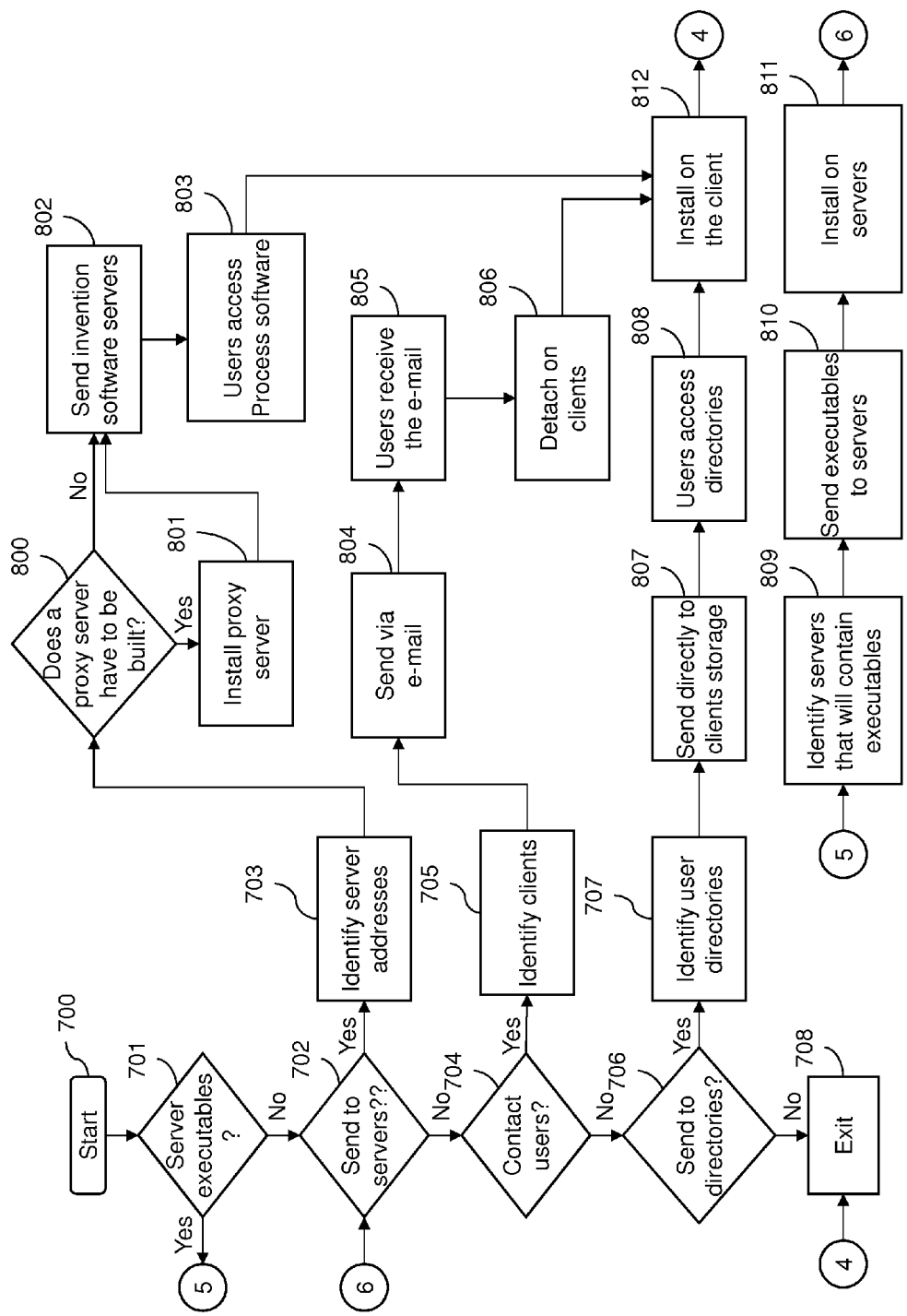
FIG. 7 is a schematic diagram of a deployment system according to systems and methods herein.

In FIG. 7, step 700 begins the deployment of the process software. The first thing is to determine if there are any programs that will reside on a server or servers when the process software is executed 701. If this is the case, then the servers that will contain the executables are identified 809. The process software for the server or servers is transferred directly to the servers' storage via FTP or some other protocol, or by copying through the use of a shared file system 810. The process software is then installed on the servers 811.

Next, a determination is made on whether the process software is to be deployed by having users access the process software on a server or servers 702. If the users are to access the process software on servers, then the server addresses that will store the process software are identified 703.

A determination is made if a proxy server is to be built 800 to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed 801. The process software is either sent to the servers via a protocol such as FTP or it is copied directly from the source files to the server files via file sharing 802. Another method would be to send a transaction to the servers that contain the process software and have the server process the transaction, then receive and copy the process software to the server's file system. Once the process software is stored at the servers, the users, via their client computers, then access the process software on the servers and copy it to their client computers' file systems 803. Another method is to have the servers automatically copy the process software to each client and then run the installation program for the process software at each client computer. The users execute the program that installs the process software on their client computer 812, and then exit the process 708.

In step 704, a determination is made whether the process software is to be deployed by sending the process software to users via e-mail. The set of users where the process software will be deployed are identified together with the addresses of the user client computers 705. The process software is sent via e-mail 804 to each of the users' client computers. The users receive the e-mail 805 and then detach the process software from the e-mail to a directory on their client computers 806. The users execute the program that installs the process software on their client computer 812, and then exit the process 708.

Lastly, a determination is made on whether the process software will be sent directly to user directories on their client computers 706. If so, the user directories are identified 707. The process software is transferred directly to the users' client computer directory 807. This can be done in several ways such as, but not limited to, sharing of the file system directories and then copying from the sender's file system to the recipient users' file system or alternatively using a transfer protocol such as File Transfer Protocol (FTP). The users access the directories on their client file systems in preparation for installing the process software 808. The users execute the program that installs the process software on their client computer 812, and then exit the process 708.

The process software is integrated into a client, server, and network environment by providing for the process software to coexist with applications, operating systems, and network operating systems software, and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely, parameters passed by the software applications to the process software will be checked to ensure the parameters match the parameters required by the process software. The client and server operating systems including the network operating systems will be identified and compared to the list of operating systems, version numbers, and network software that have been tested to work with the process software. Those operating systems, version numbers, and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 8:
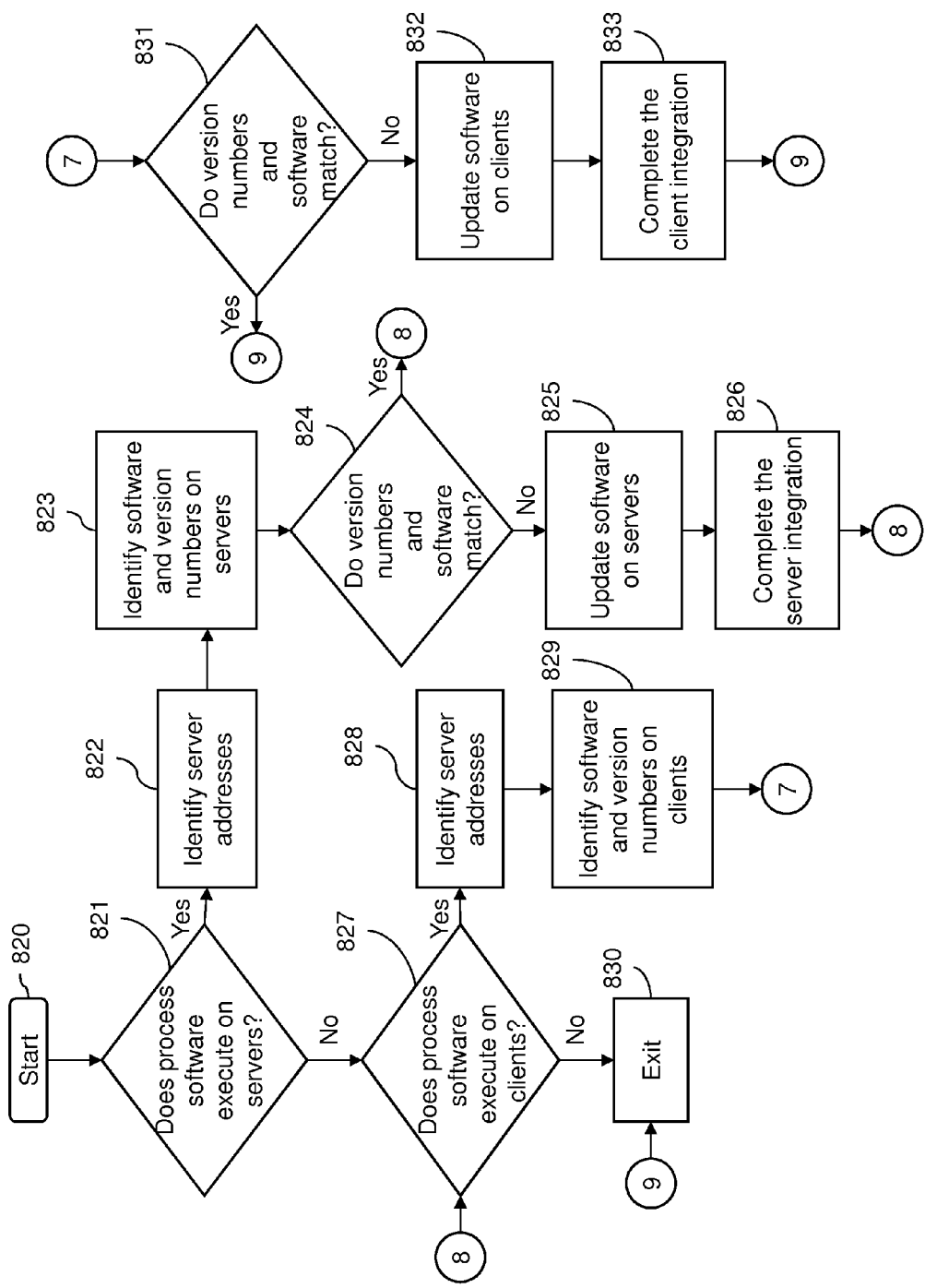
FIG. 8 is a schematic diagram of an integration system according to systems and methods herein.

In FIG. 8, step 820 begins the integration of the process software. The first thing is to determine if there are any process software programs that will execute on a server or servers 821. If this is not the case, then integration proceeds to 827. If this is the case, then the server addresses are identified 822. The servers are checked to see if they contain software that includes the operating system (OS), applications, and network operating systems (NOS), together with their version numbers that have been tested with the process software 823. The servers are also checked to determine if there is any missing software that is required by the process software 823.

A determination is made if the version numbers match the version numbers of OS, applications, and NOS that have been tested with the process software 824. If all of the versions match and there is no missing required software, the integration continues in 827.

If one or more of the version numbers do not match, then the unmatched versions are updated on the server or servers with the correct versions 825. Additionally, if there is missing required software, then it is updated on the server or servers 825. The server integration is completed by installing the process software 826.

Step 827, which follows either step 821, 824, or 826, determines if there are any programs of the process software that will execute on the clients. If no process software programs execute on the clients, the integration proceeds to 830 and exits. If this not the case, then the client addresses are identified 828.

The clients are checked to see if they contain software that includes the operating system (OS), applications, and network operating systems (NOS), together with their version numbers that have been tested with the process software 829.

The clients are also checked to determine if there is any missing software that is required by the process software 829.

A determination is made as to whether the version numbers match the version numbers of OS, applications, and NOS that have been tested with the process software 831. If all of the versions match and there is no missing required software, then the integration proceeds to 830 and exits.

If one or more of the version numbers do not match, then the unmatched versions are updated on the clients with the correct versions 832. In addition, if there is missing required software then it is updated on the clients 832. Installing the process software on the clients 833 completes the client integration. The integration proceeds to 830 and exits.

The process software can be stored on a shared file system accessible from one or more servers. The process software is executed via transactions that contain data and server processing requests that use CPU units on the accessed server. CPU units are units of time such as minutes, seconds, and hours on the central processor of the server. Additionally, the assessed server may make requests of other servers that require CPU units. CPU units are an example that represents one measurement of use. Other measurements of use include, but are not limited to, network bandwidth, memory usage, storage usage, packet transfers, complete transactions etc. When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc. approach a capacity so as to affect performance, additional network bandwidth, memory usage, storage etc. are added to share the workload. The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and/or indicated on a web site accessed by the customer, which then remits payment to the service provider. In another method, the service provider requests payment directly from a customer account at a banking or financial institution. In another method, if the service provider is also a customer of the customer that uses the process software application, the payment owed to the service provider is reconciled to the payment owed by the service provider to minimize the transfer of payments.

The process software is shared, simultaneously serving multiple customers in a flexible, automated fashion. It is standardized, requiring little customization, and it is scalable, providing capacity On-Demand in a pay-as-you-go model.

The process software can be stored on a shared file system accessible from one or more servers. The process software is executed via transactions that contain data and server processing requests that use CPU units on the accessed server. CPU units are units of time such as minutes, seconds, and hours on the central processor of the server. Additionally, the assessed server may make requests of other servers that require CPU units. CPU units are an example that represents one measurement of use. Other measurements of use include, but are not limited to, network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and/or indicated on a web site accessed by the customer, which then remits payment to the service provider.

In another method, the service provider requests payment directly from a customer account at a banking or financial institution.

In another method, if the service provider is also a customer of the customer that uses the process software application, the payment owed to the service provider is reconciled to the payment owed by the service provider to minimize the transfer of payments.

Figure 9:
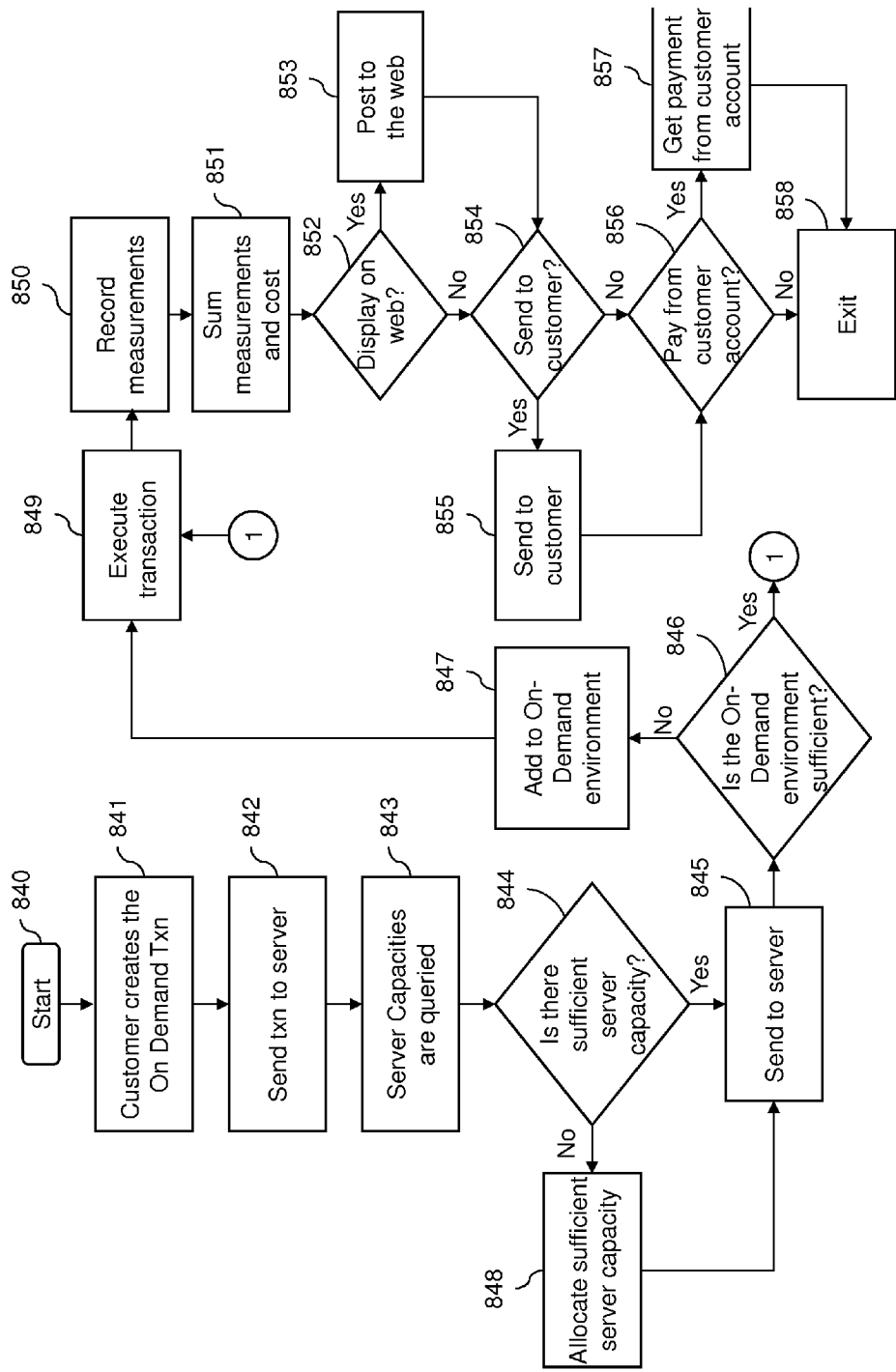
FIG. 9 is a schematic diagram of an On-Demand system according to systems and methods herein.

In FIG. 9, step 840 begins the On-Demand process. A transaction is created that contains the unique customer identification, the requested service type, and any service parameters that further specify the type of service 841. The transaction is then sent to the main server 842. In an On-Demand environment, the main server can initially be the only server, then, as capacity is consumed, other servers are added to the On-Demand environment.

The server central processing unit (CPU) capacities in the On-Demand environment are queried 843. The CPU requirement of the transaction is estimated, and then the servers' available CPU capacity in the On-Demand environment is compared to the transaction CPU requirement to see if there is sufficient CPU capacity available in any server to process the transaction 844. If there is not sufficient server CPU capacity available, then additional server CPU capacity is allocated to process the transaction 848. If there was already sufficient CPU capacity available, then the transaction is sent to a selected server 845.

Before executing the transaction, a check is made of the remaining On-Demand environment to determine if the environment has sufficient available capacity for processing the transaction. This environment capacity consists of such things as, but not limited to, network bandwidth, processor memory, storage etc. 846. If there is not sufficient available capacity, then capacity will be added to the On-Demand environment 847. Next, the required software to process the transaction is accessed, loaded into memory, and then the transaction is executed 849.

The usage measurements are recorded 850. The usage measurements consist of the portions of those functions in the On-Demand environment that are used to process the transaction. The usage of such functions as, but not limited to, network bandwidth, processor memory, storage, and CPU cycles are what are recorded. The usage measurements are summed, multiplied by unit costs, and then recorded as a charge to the requesting customer 851. If the customer has requested that the On-Demand costs be posted to a web site 852, then they are posted 853.

If the customer has requested that the On-Demand costs be sent via e-mail to a customer address 854, then they are sent 855. If the customer has requested that the On-Demand costs be paid directly from a customer account 856, then payment is received directly from the customer account 857. The last step is to exit the On-Demand process 858.

The process software may be deployed, accessed and executed through the use of a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee.

The process software may be deployed, accessed, and executed through either a remote-access or a site-to-site VPN. When using the remote-access VPNs, the process software is deployed, accessed, and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download, and execute the process software.

When using the site-to-site VPN, the process software is deployed, accessed, and executed through the use of dedicated equipment and large-scale encryption, which are used to connect a company's multiple fixed sites over a public network, such as the Internet.

The process software is transported over the VPN via tunneling, which is the process of placing an entire packet within another packet and sending it over a network. The protocol of the outer packet is understood by the network and both points, called tunnel interfaces, where the packet enters and exits the network.

Figure 10:
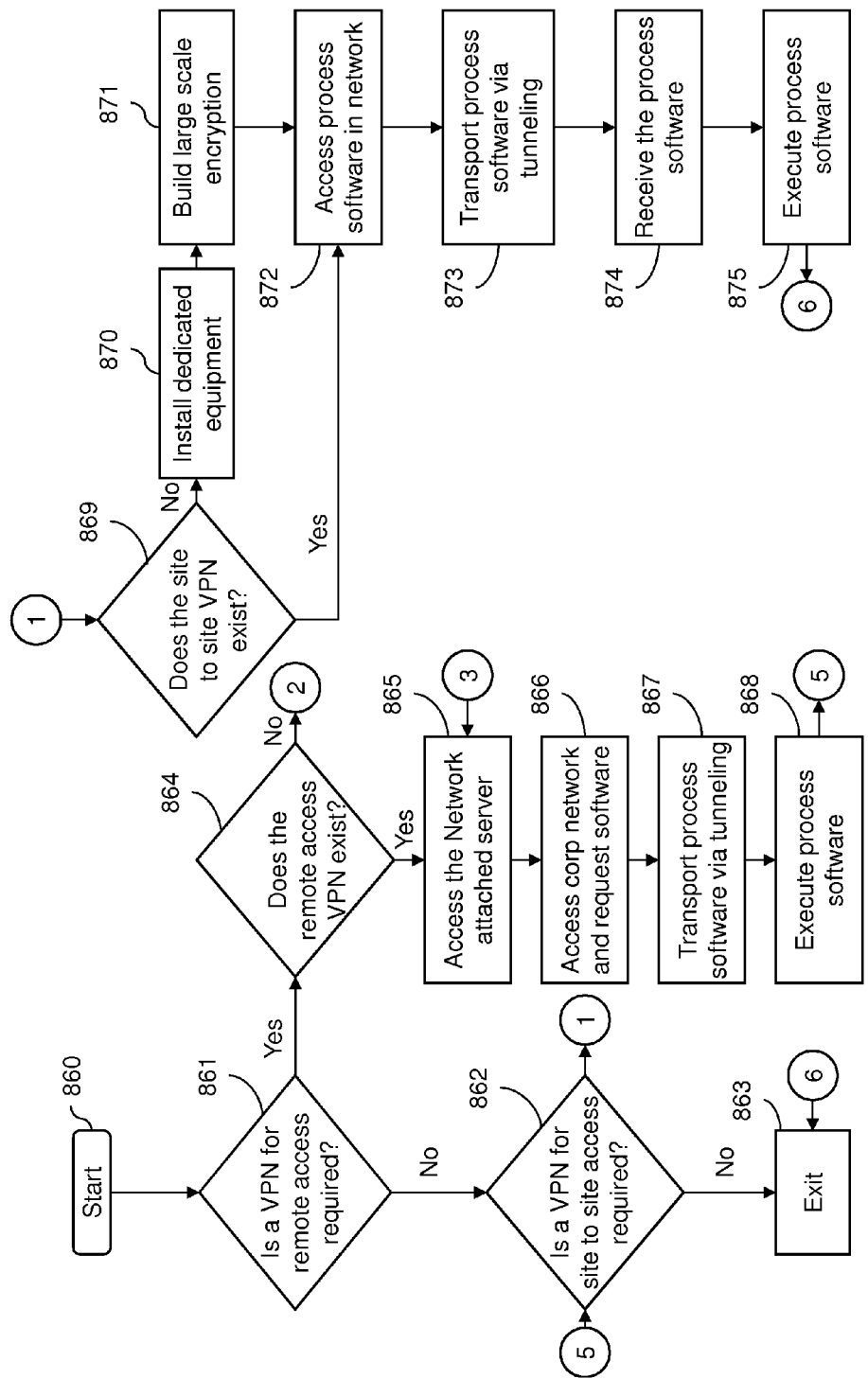
FIG. 10 is a schematic diagram of a virtual private network system according to systems and methods herein.

In FIGS. 10 and 11, step 860 begins the Virtual Private Network (VPN) process. A determination is made to see if a VPN for remote access is required 861. If it is not required, then proceed to 862. If it is required, then determine if the remote access VPN exists 864.

If it does exist, then proceed to 865. Otherwise, identify the third party provider that will provide the secure, encrypted connections between the company's private network and the company's remote users 876. The company's remote users are identified 877. The third party provider then sets up a network access server (NAS) 878 that allows the remote users to dial a toll-free number or attach directly via a cable or DSL modem to access, download, and install the desktop client software for the remote-access VPN 879.

After the remote access VPN has been built, or if it been previously installed, the remote users can then access the process software by dialing into the NAS or attaching directly via a cable or DSL modem into the NAS 865. This allows entry into the corporate network where the process software is accessed 866. The process software is transported to the remote users' desktop over the network via tunneling. That is, the process software is divided into packets and each packet, including the data and protocol, is placed within another packet 867. When the process software arrives at the remote users' desktop, it is removed from the packets, reconstituted, and executed on the remote users' desktop 868.

A determination is made to see if a VPN for site-to-site access is required 862. If it is not required, then proceed to exit the process 863. Otherwise, determine if the site-to-site VPN exists 869. If it does exist, then proceed to 872. Otherwise, install the dedicated equipment required to establish a site-to-site VPN 870. Then build the large-scale encryption into the VPN 871.

After the site-to-site VPN has been built, or if it had been previously established, the users access the process software via the VPN 872. The process software is transported to the site users over the network via tunneling 873. That is, the process software is divided into packets and each packet, including the data and protocol, is placed within another packet 874. When the process software arrives at the remote users' desktop, it is removed from the packets, reconstituted, and executed on the site users' desktop 875. Proceed to exit the process 863.

The terminology used herein is for the purpose of describing particular systems and methods only and is not intended to be limiting of this disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements).

The corresponding structures, materials, acts, and equivalents of all means or step plus function elements in the claims below are intended to include any structure, material, or act for performing the function in combination with other claimed elements as specifically claimed. The descriptions of the various systems and methods herein have been presented for purposes of illustration, but are not intended to be exhaustive or limited to the systems and methods disclosed. Many modifications and variations will be apparent to those of ordinary skill in the art without departing from the scope and spirit of the described systems and methods. The terminology used herein was chosen to best explain the principles of the systems and methods, the practical application or technical improvement over technologies found in the marketplace, or to enable others of ordinary skill in the art to understand the systems and methods disclosed herein.

What is claimed is:

1. A method, comprising:
   identifying a portion of an electronic circuit;
   fabricating said portion of said electronic circuit in at least two versions;
   evaluating each of said at least two versions using a plurality of operating conditions;
   determining clock frequency and supply voltage being applied to said electronic circuit, using a computer;
   identifying one version of said at least two versions as a selected version, using said computer, said selected version having relatively optimal performance based on at least one of:
   frequency requirements,
   power constraints, and
   process variation;
   activating said selected version for use in said portion of said electronic circuit; and
   deactivating remaining versions of said at least two versions at a specified time after said activating said selected version.

2. The method according to claim 1, wherein said at least two versions comprise one of:
   different wiring levels;
   different wiring sizes;
   different sized transistors;
   different transistor thresholds; and
   different buffer spacing.

3. The method according to claim 1, wherein said plurality of operating conditions comprises:
   different clock frequencies;
   different supply voltages;
   different power limits; and
   different process points.

4. The method according to claim 1, wherein said identifying a portion of said electronic circuit comprises identifying said portion of said electronic circuit having critical timing.

5. The method of claim 1, wherein said at least two versions share at least one memory element.

6. The method of claim 1, further comprising:
   copying a value in at least one memory element into said selected version from remaining versions of said at least two versions.

7. A method comprising:
   identifying at least one portion of an electronic circuit;
   fabricating at least two versions of said at least one portion of said electronic circuit;
   evaluating each of said at least two versions of said at least one portion of said electronic circuit for performance under at least two operating conditions;
   determining current operating conditions comprising clock frequency and supply voltage being applied to said electronic circuit, using a computer;
   determining a relative best one version of said at least two versions of said at least one portion of said electronic circuit based on said performance under said current operating conditions, using said computer;
   activating said relative best one version for said current operating conditions for said at least one portion of said electronic circuit;
   deactivating remaining versions of said at least two versions at a specified time after said activating said relative best one version; and
   repeating said determining a relative best one version, said activating said relative best one version, and said deactivating remaining versions during usage of said electronic circuit to dynamically select different versions of said at least two versions as said relative best one version as said current operating conditions change.

8. The method according to claim 7, wherein said at least two versions of said at least one portion of said electronic circuit comprise one of:
   different wiring levels;

different wiring sizes;
different sized transistors;
different transistor thresholds; and
different buffer spacing.

9. The method according to claim 7, wherein said plurality of operating conditions comprises:
different clock frequencies;
different supply voltages;
different power limits; and
different process points.

10. The method according to claim 7, wherein said determining a relative best one version of said at least two versions is based on:
frequency requirements;
power constraints; and
process variation.

11. The method according to claim 7, wherein said identifying a portion of said electronic circuit comprises identifying said portion of said electronic circuit having critical timing.

12. The method of claim 7, wherein said at least two versions share at least one memory element.

13. The method of claim 7, further comprising:
copying a value in at least one memory element into said relative best one version from remaining versions of said at least two versions.

14. The method of claim 1, further comprising:
repeating said identifying one version of said at least two versions as a selected version and said activating said selected version during usage of said electronic circuit to dynamically select different versions of said at least two versions as said selected version as said clock frequency and supply voltage change.

15. A method, comprising:
identifying a portion of an electronic circuit;
fabricating said portion of said electronic circuit in at least two versions;
evaluating each of said at least two versions under a plurality of operating conditions, using a computer;
identifying one version of said at least two versions as a selected version, using said computer, said selected version having relatively optimal performance based on at least one of:
frequency requirements,
power constraints, and
process variation;
activating said selected version for use in said portion of said electronic circuit; and
deactivating remaining versions of said at least two versions after said activating said selected version.

16. The method of claim 15, further comprising:
repeating said identifying one version of said at least two versions as a selected version and said activating said selected version during usage of said electronic circuit to dynamically select different versions of said at least two versions as said selected version as clock frequency and supply voltage applied to said electronic circuit change.

17. The method according to claim 15, wherein said at least two versions of said at least one portion of said electronic circuit comprise:
different wiring levels;
different wiring sizes;
different sized transistors;
different transistor thresholds; or
different buffer spacing.

18. The method according to claim 15, wherein said plurality of operating conditions comprises:
different clock frequencies;
different supply voltages;
different power limits; or
different process points.

19. The method of claim 15, wherein said at least two versions share at least one memory element.

20. The method of claim 19, further comprising:
copying a value in at least one memory element into said relative best one version from remaining versions of said at least two versions.

* * * * *